(12) United States Patent
Lambert et al.

(10) Patent No.: US 8,281,163 B2
(45) Date of Patent: Oct. 2, 2012

(54) SYSTEM AND METHOD FOR PROVIDING POWER CONTROL FAULT MASKING

(75) Inventors: Timothy M. Lambert, Austin, TX (US); Ralph Johnson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 345 days.

(21) Appl. No.: 12/724,709

(22) Filed: Mar. 16, 2010

(65) Prior Publication Data

US 2011/0231675 A1 Sep. 22, 2011

(51) Int. Cl.
*G06F 1/00* (2006.01)
*G06F 1/26* (2006.01)
*B23K 11/24* (2006.01)

(52) U.S. Cl. .................. 713/300; 713/320; 323/318

(58) Field of Classification Search .............. 713/300, 713/324
See application file for complete search history.

(56) References Cited

U.S. PATENT DOCUMENTS

| 4,932,040 A | 6/1990 | Barlow | 375/111 |
| 5,551,033 A | 8/1996 | Foster et al. | 395/650 |
| 5,574,346 A | 11/1996 | Chavan et al. | 318/434 |
| 6,457,078 B1 | 9/2002 | Magro et al. | 710/105 |
| 7,208,925 B2 * | 4/2007 | Rose | 323/280 |
| 7,844,840 B2 * | 11/2010 | McShane et al. | 713/300 |
| 2002/0188873 A1 * | 12/2002 | Berglund et al. | 713/300 |
| 2004/0215991 A1 * | 10/2004 | McAfee et al. | 713/324 |
| 2006/0043946 A1 * | 3/2006 | Rose | 323/280 |
| 2008/0106248 A1 * | 5/2008 | Qahouq et al. | 323/318 |

* cited by examiner

*Primary Examiner* — Suresh Suryawanshi
(74) *Attorney, Agent, or Firm* — Baker Botts L.L.P.

(57) ABSTRACT

Systems and methods for reducing problems and disadvantages associated with traditional approaches to masking false faults generated by voltage regulators are provided. A method may include receiving, at a voltage regulator configured to be enabled by a power controller communicatively coupled to the voltage regulator via an enable line, a first indication from a device other than the power controller indicating that the voltage regulator is to be disabled, wherein the enable line is configured to communicate a second indication from the power controller to the voltage regulator indicating whether the voltage regulator is to be enabled. In response to receipt of the first signal, the voltage regulator may communicate to the power controller via the enable line, a third indication indicating that the voltage regulator has been disabled by a device other than the power controller.

20 Claims, 2 Drawing Sheets

SYSTEM AND METHOD FOR PROVIDING POWER CONTROL FAULT MASKING

TECHNICAL FIELD

The present disclosure relates in general to information handling systems, and more particularly to masking false faults generated by voltage regulators in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An indispensible part an information handling system is its power system. A power system of an information handling system, or other device, may include a power source, one or more voltage regulators for controlling one or more voltages distributed to various components of the information handling system, a power controller for controlling operation of the various voltage regulators, and a distribution network for distributing electrical current produced by the one or more voltage regulators to various components of the information handling system.

Often it is desirable to intentionally disable or power down a voltage regulator in order to reduce power consumption in an information handling system. For example, it may be determined that a portion of memory on an information handling system is unused. Accordingly, a voltage regulator providing electrical current to such portion of memory may be intentionally disabled in order to reduce power consumption. The disabling may occur as a result of a message or command communicated to the voltage regulator by a processor or access controller, and any such command may be communicated automatically (e.g., by means of a program executing on the processor that determines that it is advisable to disable a voltage regulator in order to conserve power) or manually (e.g., a user or administrator may determine that it is advisable to disable a voltage regulator and manually issues a command to do so).

However, when a voltage regulator is disabled, it may indicate to a power controller that the voltage regulator is no longer receiving or producing power. Accordingly, unless the fact that the voltage regulator has been intentionally disabled (as opposed to experiencing a fault condition) is communicated to the power controller, the power controller may detect a false fault, and may in response take unneeded and undesirable corrective action (e.g., by disabling power throughout other portions of the information handling system).

In traditional approaches, such false faults are masked via a somewhat complex method involving handshakes among various components of the information handling system. For example, if an intentional disable originates from a processor, the processor may communicate to the information handling system's basic input/output system (BIOS) of the intent to disable a voltage regulator prior to issuing a disable command to the voltage regulator. The BIOS may then write a masking bit to a register file in a power controller to prevent the power controller from interpreting the disabling of the voltage regulator as a fault. If an intentional disable originates from an access controller, the access controller may, prior to issuing a disable command to the voltage regulator, write a masking bit to a register file in a power controller to prevent the power controller from interpreting the disabling of the voltage regulator as a fault. Such complex handshaking requires undesirable design complexity.

SUMMARY

In accordance with the teachings of the present disclosure, the disadvantages and problems associated with traditional approaches to masking false faults generated by voltage regulators have been reduced or eliminated.

In accordance an embodiment of the present disclosure, a method may include receiving, at a voltage regulator configured to be enabled by a power controller communicatively coupled to the voltage regulator via an enable line, a first indication from a device other than the power controller indicating that the voltage regulator is to be disabled, wherein the enable line is configured to communicate a second indication from the power controller to the voltage regulator indicating whether the voltage regulator is to be enabled. In response to receipt of the first signal, the voltage regulator may communicate to the power controller via the enable line, a third indication indicating that the voltage regulator has been disabled by a device other than the power controller.

In accordance with another embodiment of the present disclosure, a system may include logic for receiving, at a voltage regulator configured to be enabled by a power controller communicatively coupled to the voltage regulator via an enable line, a first indication from a device other than the power controller indicating that the voltage regulator is to be disabled, wherein the enable line is configured to communicate a second indication from the power controller to the voltage regulator indicating whether the voltage regulator is to be enabled. The system may also include logic for, in response to receipt of the first signal, communicating by the voltage regulator to the power controller via the enable line, a third indication indicating that the voltage regulator has been disabled by a device other than the power controller.

In accordance with a further embodiment of the present disclosure, an information handling system may include a processor, a memory communicatively coupled to the processor, a power controller, and a voltage regulator communicatively coupled to the processor and the power controller. The voltage regulator may be configured to: (a) receive via an enable line communicatively coupling the power controller and the voltage regulator a first indication indicating whether the voltage regulator is to be enabled; (b) receive from a device other than the power controller a second indication indicating that the voltage regulator is to be disabled; and (c) in response to in response to receipt of the first signal, communicate to the power controller via the enable line a third indication indicating that the voltage regulator has been disabled by a device other than the power controller.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
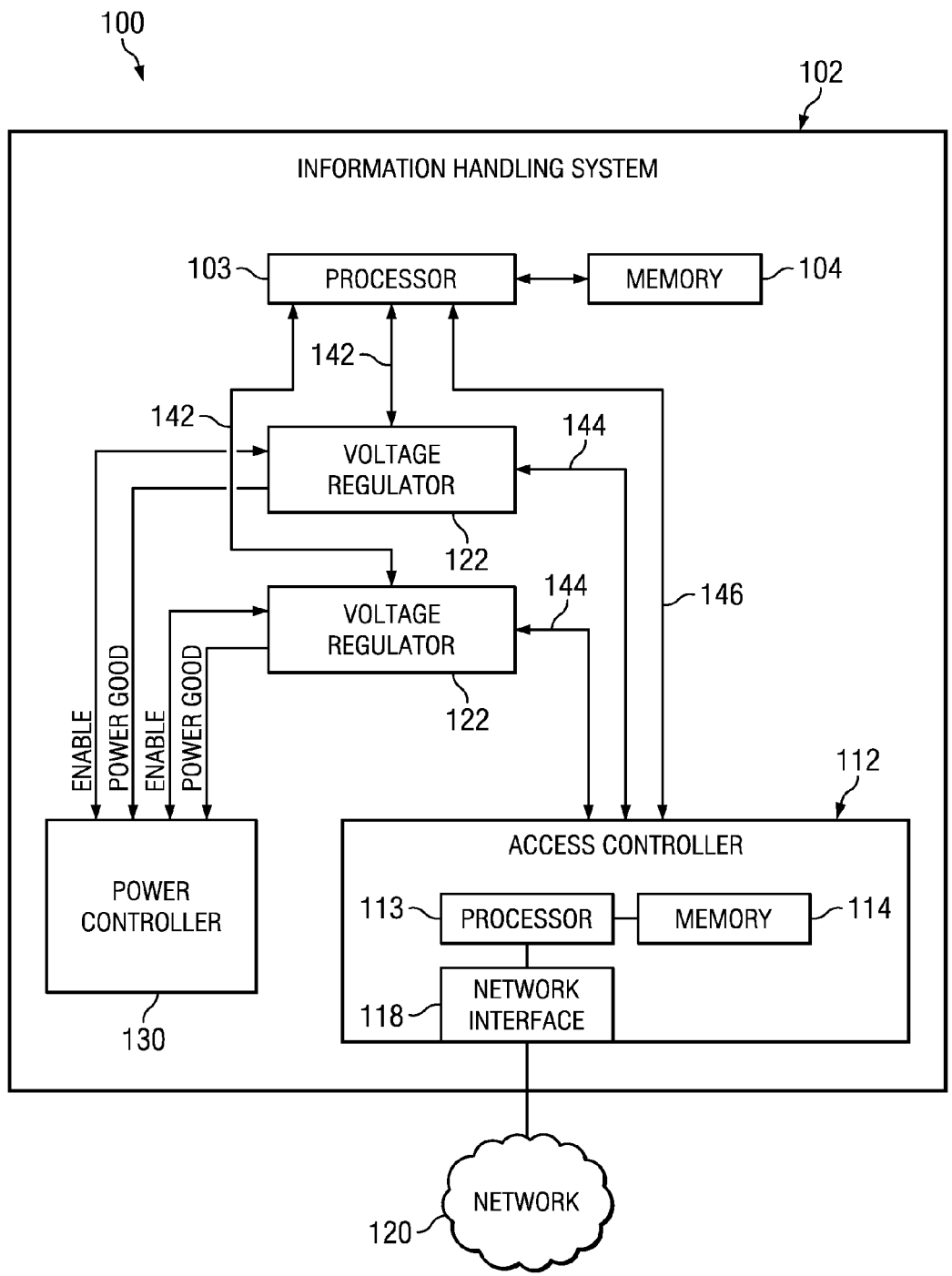
FIG. 1 illustrates a block diagram of an example system for masking false power faults in an information handling system, in accordance with certain embodiments of the present disclosure.
Figure 2:
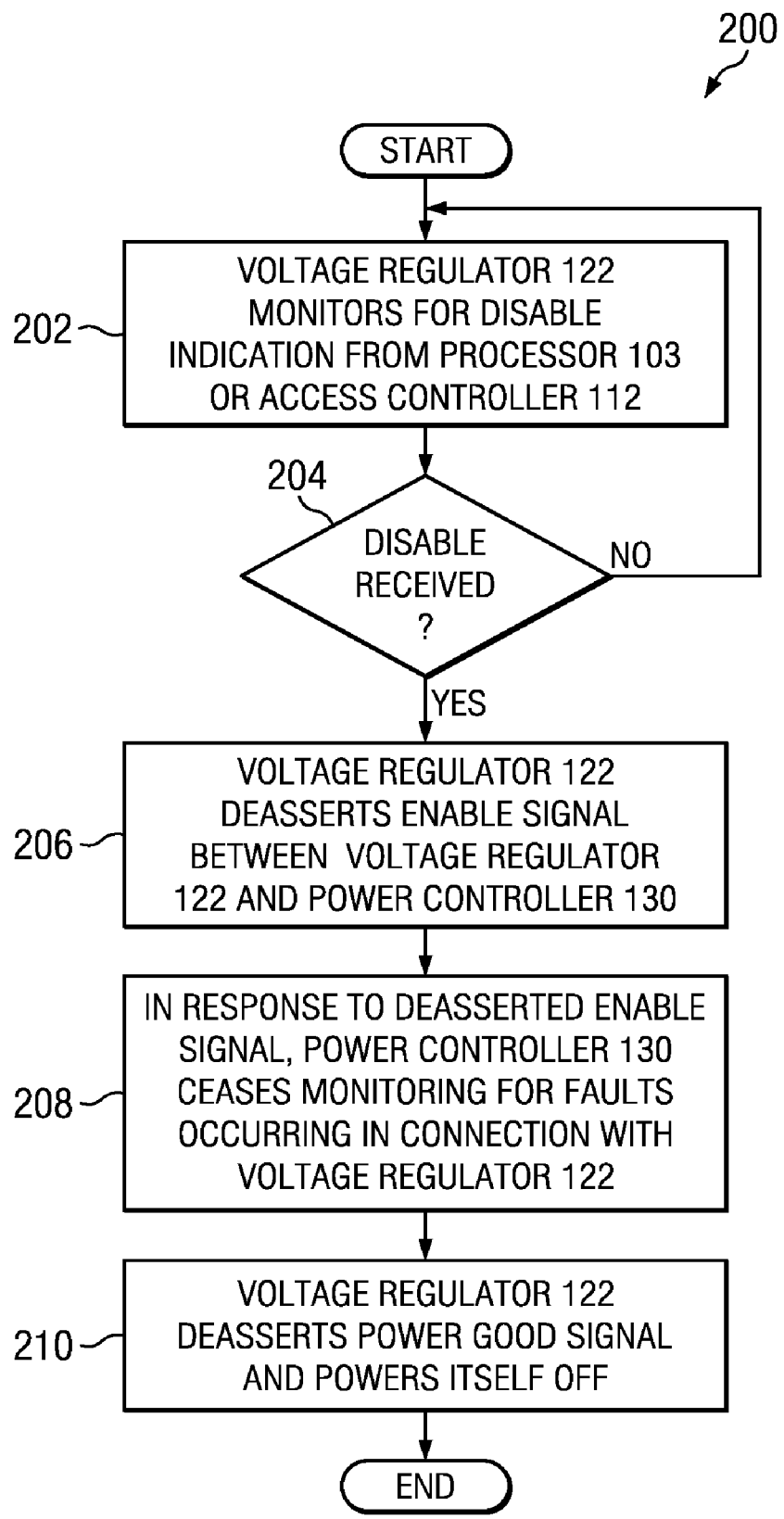
FIG. 2 illustrates a flow chart of an example method for masking false power faults in an information handling system, in accordance with certain embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100 for masking false power faults in an information handling system 102, in accordance with certain embodiments of the present disclosure. As depicted in FIG. 1, system 100 may include an information handling system 102 and a network 120.

Information handling system 102 may generally be operable to receive data from and/or communicate data to one or more other information handling systems via network 120. In certain embodiments, information handling system 102 may be a server. In another embodiment, information handling system 102 may be a personal computer (e.g., a desktop computer or a portable computer). As depicted in FIG. 1, information handling system 102 may include a processor 103, a memory 104 communicatively coupled to processor 103, an access controller 112 coupled to processor 103, one or more voltage regulators 122 communicatively coupled to processor 103 and access controller 112, and a power controller 130 communicatively coupled to the one or more voltage regulators 122.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102. Although FIG. 1 depicts information handling system 102 as including one processor 103, information handling system 102 may include any suitable number of processors 103.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off. Although FIG. 1 depicts information handling system 102 as including one memory 104, information handling system 102 may include any suitable number of memories 104.

Access controller 112 may be communicatively coupled to processor 103 via a communications bus 146, and may be any system, device, or apparatus configured to permit an administrator or other person to remotely monitor and/or remotely manage information handling system 102 (e.g., via an information handling system remotely connected to information handling system 102 via network 120) regardless of whether information handling system 102 is powered on and/or has an operating system installed thereon. In certain embodiments, access controller 112 may allow for "out-of-band" control of information handling system 102, such that communications to and from access controller 112 are communicated via a management channel physically isolated from the "in band" communication via another network interface of information handling system 102. Thus, for example, if a failure occurs in information handling system 102 that prevents an administrator from remotely accessing information handling system 102 via network interface 118 (e.g., operating system failure, power failure, etc.), the administrator may still be able to monitor and/or manage the information handling system 102 (e.g., to diagnose problems that may have caused failure) via access controller 112. In the same or alternative embodiments, access controller 112 may allow an administrator to remotely manage one or more parameters associated with operation of information handling system 102 (e.g., power usage, processor allocation, memory allocation, security privileges, enabling and disabling of voltage regulators, etc.). In certain embodiments, access controller 112 may include or may be an integral part of a Dell Remote Access Controller (DRAC) or an Integrated Dell Remote Access Controller (iDRAC).

As depicted in FIG. 1, access controller 112 may include a processor 113, a memory 114 communicatively coupled to processor 113, and a network interface 118 communicatively coupled to processor 113.

Processor 113 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102. Although FIG. 1 depicts access controller 112 as including one processor 103, access controller 112 may include any suitable number of processors 103.

Memory 114 may be communicatively coupled to processor 113 and may include any system, device, or apparatus configured to retain program instructions and/or data for a period of time (e.g., computer-readable media). Memory 114 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off or power to access controller 112 is removed. In certain embodiments, memory 114 may store firmware that includes executable instructions to govern operation of access controller 112. Although FIG. 1 depicts access controller 112 as including one memory 104, access controller 112 may include any suitable number of memories 104.

Network interface 118 may include any suitable system, apparatus, or device operable to serve as an interface between access controller 112 and network 120. Network interface 118 may enable access controller 102 to communicate over network 120 using any suitable transmission protocol and/or standard, including without limitation all transmission protocols and/or standards enumerated below with respect to the discussion of network 120.

Network 120 may be a network and/or fabric configured to communicatively couple information handling system 102, access controller 112, other information handling systems, and/or other networked components to each other. Network 120 may include a communication infrastructure, which provides physical connections, and a management layer, which organizes the physical connections of information handling system 102 and access controller 112. In the same or alternative embodiments, network 120 may allow block I/O services and/or file access services to network-attached computer-readable media.

Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data using any storage and/or communication protocol, including without limitation, Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

Each voltage regulator 122 may be communicatively coupled to processor 103 via a bus 142 (e.g., a serial voltage identification interface) and communicatively coupled to access controller 112 via a bus 144 (e.g., an Inter-Integrated Circuit bus, a power management bus), and may include any system, device, or apparatus configured to automatically maintain a substantially constant voltage level for electrical current to devices electrically coupled to such voltage regulator 122. A voltage regulator 122 may be an alternating current (AC) voltage regulator or a direct current (DC) voltage regulator. Although FIG. 1 depicts information handling system 102 as including two voltage regulators 122, information handling system 102 may include any suitable number of voltage regulators 122.

Power controller 130 may be any system, device or apparatus configured to manage and/or control power consumption of information handling system 102, including management and/or control of voltage regulators 122, enablement and/or disablement one or more individual voltage regulators 122, and/or power sequencing of various components of information handling system 102. In some embodiments, power controller 130 may also provide fault monitoring and/or failsafe protection for the power distribution system of information handling system 102 (including, without limitation, fault monitoring and/or failsafe protection of voltage regulators 122).

In operation, power controller 130 may enable one or more voltage regulators 122 by selectively asserting and/or deasserting an "enable" signal communicated to each of voltage regulators 122 via an enable line. As used herein, "line" may comprise a generally electrically conductive medium configured to carry the "enable" signal, or any other suitable signal transmission medium. In addition, processor 103 may disable a voltage regulator 122 enabled by power controller 130 by communicating an appropriate signal to such voltage regulator 122 (e.g., via a serial voltage identification interface or other suitable interface or bus). Furthermore, access controller 112 may disable a voltage regulator 122 enabled by power controller 130 by communicating an appropriate signal to such voltage regulator 122 (e.g., via inter-integrated circuit bus, power management bus, or other suitable interface or bus).

Each voltage regulator 122 may communicate to power controller 130 an indication of its power status via a "power good" signal communicated to power controller 130 via a power good line. If a voltage regulator 122 is operating correctly without any faults, such voltage regulator 122 may assert the "power good" signal. Otherwise, if a voltage regulator 122 experiences a fault or other condition that causes such voltage regulator to operate incorrectly or output a voltage other than the desired voltage, such voltage regulator may deassert the "power good" signal. Disabling of a voltage regulator 122 by processor 103 or access controller 112 may also cause such voltage regulator to deassert the "power good" signal, causing such voltage regulator 122 to, in effect, communicate a "false fault" to power controller 130.

To prevent power controller 130 from taking remedial action due to a "false fault" caused by processor 103 or access controller 112 disabling of a voltage regulator 122, each voltage regulator 122 may, in response to receiving a command to disable from either or both of processor 103 and access controller 112, may deassert the "enable" signal on the enable line between such voltage regulator 122 and power controller 130. Thus, the "enable" signal may be a bidirectional signal between each voltage regulator 122 and power controller 130.

Power controller 130 may monitor the state of each "enable" signal associated with a voltage regulator 122. If power controller 130 detects that an "enable" signal has been deasserted, it may cease monitoring for faults related to the voltage regulator 122 associated with the deasserted enable signal. Accordingly, the "enable" signal may mask false faults such that such false faults are not processed by power controller 130.

FIG. 2 illustrates a flow chart of an example method 200 for masking false power faults in an information handling system 102, in accordance with certain embodiments of the present disclosure. According to one embodiment, method 200 may begin at step 202. As noted above, teachings of the present disclosure may be implemented in a variety of configurations of system 100. As such, the preferred initialization point for method 200 and the order of the steps 202-210 comprising method 200 may depend on the implementation chosen.

At step 202 a voltage regulator 122 may monitor for a disable indication from processor 103, access controller 112, or a component of system 100 other than power controller 130.

At step 204, voltage regulator 122 may make a determination of whether such disable indication has been received. If a disable indication has been received, method 200 may proceed to step 206. Otherwise, method 200 may proceed again to step 202.

At step 206, voltage regulator 122 may deassert its respective "enable" signal between such voltage regulator 122 and power controller 130.

At step 208, in response to the deasserted enable signal, power controller 130 may cease to monitor for faults occurring in connection with the voltage regulator 122.

At step 210, voltage regulator 122 may deassert its respective "power good" signal between such voltage regulator 122 and power controller 130, and may power itself off. After completion of step 210, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media.

Despite the command-driven voltage regulator disable mechanism described above with respect to FIG. 2, a disable indication for a voltage regulator 122 may be initiated by power controller 130. In fact, any such power controller-initiated may supersede a command-driven disable and may reset the power controller's fault monitoring logic.

Using the methods and systems disclosed herein, problems associated with conventional approaches to provisioning of an information handling system may be reduced or eliminated. For example, using the methods and systems disclosed herein, false faults occurring in a voltage regulator may be masked without complex handshaking required in traditional approaches.

A component of system 100 may include logic. Logic may performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

Although the present disclosure has been described in detail, it should be understood that various changes, substitutions, and alterations can be made hereto without departing from the spirit and the scope of the disclosure as defined by the appended claims.

What is claimed is:

1. A method comprising:
receiving, at a voltage regulator configured to be enabled by a power controller communicatively coupled to the voltage regulator via an enable line, a first indication from a device other than the power controller indicating that the voltage regulator is to be disabled, wherein the enable line is configured to communicate a second indication from the power controller to the voltage regulator indicating whether the voltage regulator is to be enabled; and
in response to receipt of the first signal, communicating by the voltage regulator to the power controller via the enable line, a third indication indicating that the voltage regulator has been disabled by a device other than the power controller.

2. A method according to claim 1, wherein the second indication comprises assertion of an enable signal, and the voltage regulator is configured to be enabled in response to receiving the asserted enable signal.

3. A method according to claim 2, wherein the third indication comprises deassertion of the enable signal.

4. A method according to claim 1, wherein the device other than the power controller comprises a processor.

5. A method according to claim 1, wherein the device other than the power controller comprises an access controller.

6. A method according to claim 1, further comprising:
monitoring, by the power controller, for faults associated with the voltage regulator;
detecting, by the power controller, the third indication; and
in response to detecting the third indication, ignoring, by the power controller, fault indications associated with the voltage regulator.

7. A system, comprising:
logic for receiving, at a voltage regulator configured to be enabled by a power controller communicatively coupled to the voltage regulator via an enable line, a first indication from a device other than the power controller indicating that the voltage regulator is to be disabled, wherein the enable line is configured to communicate a second indication from the power controller to the voltage regulator indicating whether the voltage regulator is to be enabled; and
logic for, in response to receipt of the first signal, communicating by the voltage regulator to the power controller via the enable line, a third indication indicating that the voltage regulator has been disabled by a device other than the power controller.

8. A system according to claim 7, wherein the second indication comprises assertion of an enable signal, and the voltage regulator is configured to be enabled in response to receiving the asserted enable signal.

9. A system according to claim 8, wherein the third indication comprises deassertion of the enable signal.

10. A system according to claim 7, wherein the device other than the power controller comprises a processor.

11. A system according to claim 7, wherein the device other than the power controller comprises an access controller.

12. A system according to claim 7, further comprising:
logic for monitoring, by the power controller, for faults associated with the voltage regulator;
logic for detecting, by the power controller, the third indication; and
logic for, in response to detecting the third indication, ignoring, by the power controller, fault indications associated with the voltage regulator.

13. An information handling system comprising:
a processor;
a memory communicatively coupled to the processor;
a power controller; and
a voltage regulator communicatively coupled to the processor and the power controller and configured to:
receive via an enable line communicatively coupling the power controller and the voltage regulator a first indication indicating whether the voltage regulator is to be enabled;
receive from a device other than the power controller a second indication indicating that the voltage regulator is to be disabled; and
in response to receipt of the first signal, communicate to the power controller via the enable line a third indication indicating that the voltage regulator has been disabled by a device other than the power controller.

14. An information handling system according to claim 13, further comprising:
the power controller configured to communicate the second indication by asserting an enable signal; and
the voltage regulator further configured to be enabled in response to receiving the asserted enable signal.

15. An information handling system according to claim 14, further comprising the voltage regulator configured to communicate the third indication by deasserting the enable signal.

16. An information handing system according to claim 13, wherein the device other than the power controller comprises the processor.

17. An information handling system according to claim 13, wherein the device other than the power controller comprises an access controller.

18. An information handling system according to claim 17, further comprising the access controller.

19. An information handling system according to claim 13, the power controller configured to:
monitor for faults associated with the voltage regulator;
detect the third indication; and
in response to detecting the third indication, ignore fault indications associated with the voltage regulator.

20. An information handling system according to claim 19, wherein the power controller is further configured to monitor faults by monitoring a line other than the enable line.

\* \* \* \* \*